US006993876B1

(12) United States Patent
Peng et al.

(10) Patent No.: US 6,993,876 B1
(45) Date of Patent: Feb. 7, 2006

(54) ASPHALT ROOFING COMPOSITE INCLUDING ADHESION MODIFIER-TREATED GLASS FIBER MAT

(75) Inventors: Qinyun Peng, Pine Brook, NJ (US); Krishna Srinivasan, Mahwah, NJ (US); William D. Lee, Sparta, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 603 days.

(21) Appl. No.: 09/484,749

(22) Filed: Jan. 18, 2000

(51) Int. Cl.
*E04D 1/00* (2006.01)
*B32B 27/12* (2006.01)

(52) U.S. Cl. ......................... 52/514; 52/514.5; 52/518; 52/534; 428/399.4; 428/484; 428/505; 428/524; 442/157; 442/160; 442/170; 442/176; 442/180

(58) Field of Classification Search ............... 428/36.1, 428/40.3, 40.4, 43, 49, 74, 141, 142, 143, 428/144, 147, 145, 149, 292.1, 297.4, 294.7, 428/299.4, 489, 505, 524; 156/164.4; 442/157, 442/160, 170, 171, 172, 176, 178, 180, 301; 52/514, 514.5, 518, 534, 537
See application file for complete search history.

(56) References Cited

U.S. PATENT DOCUMENTS 3,865,682 A * 2/1975 Marzocchi et al. ...... 260/448.8
4,292,371 A * 9/1981 Marzocchi et al. ......... 428/378
4,294,879 A 10/1981 McHenry
4,349,388 A * 9/1982 Marzocchi et al. ..... 106/281 N
4,412,078 A * 10/1983 Berger ........................ 548/110
4,430,465 A 2/1984 Abbott
4,500,600 A 2/1985 Wong et al.
4,596,737 A 6/1986 Werbowy et al.
4,681,798 A 7/1987 Gill et al.
4,749,614 A 6/1988 Andrews et al.
4,752,632 A 6/1988 Arnason et al.
4,917,764 A 4/1990 Lalwani et al.
4,931,318 A 6/1990 Romberger et al.
4,990,549 A * 2/1991 Delvin et al. ............... 523/209
5,032,431 A 7/1991 Conner et al.
5,116,890 A 5/1992 Floyd et al.
5,130,354 A * 7/1992 Gelles ......................... 524/68
5,296,025 A 3/1994 Basin et al.
5,334,648 A 8/1994 Drews et al.
5,403,654 A 4/1995 Muto et al.
5,503,920 A 4/1996 Alkire et al.
5,518,586 A 5/1996 Mirous
5,672,641 A * 9/1997 Beer et al. .................. 523/214
5,744,229 A 4/1998 Gleason et al.
5,804,254 A 9/1998 Nedwick et al.
5,804,313 A * 9/1998 Schell ........................ 428/391
5,851,933 A 12/1998 Swartz et al.
5,942,073 A * 8/1999 Mowrer et al. ............. 156/329

FOREIGN PATENT DOCUMENTS

WO WO 99/13154 9/1998

* cited by examiner

*Primary Examiner*—Arti R. Singh
(74) *Attorney, Agent, or Firm*—William J. Davis; Walter Katz

(57) ABSTRACT

Enhanced tear strength asphalt roofing composites, e.g., roofing shingles which can meet the current ASTM D-3462 standard for tear strength, include an adhesion modifier treated, preferably a polysiloxane treated, glass fiber mat.

7 Claims, 1 Drawing Sheet

ASPHALT ROOFING COMPOSITE INCLUDING ADHESION MODIFIER-TREATED GLASS FIBER MAT

BACKGROUND OF THE INVENTION

1. Field of the Invention

This invention relates to asphalt products having enhanced tear strength, and more particularly, to asphalt composites including an adhesion modifier, preferably a polysiloxane treated, glass fiber mats which can meet the current ASTM D-3462 standard for tear strength required of asphalt roofing shingles.

2. Description of the Prior Art

Asphalt is a dark brown or black cementitious material comprised predominantly of bitumins that occur in nature or are obtained as a residue in the refining of petroleum. Asphalt has been used for many years for roofing and road-paving applications to form a water-impermeable barrier between the environment and an underlying surface. However, in its pure state, asphalt is not quite suitable as a water-impermeable barrier since it is brittle in freezing temperatures and fluid in hot temperatures. Accordingly, the prior art has modified the asphalt both in a composition aspect and in combining the asphalt with carriers or reinforcing materials so as to provide asphaltic products with the desirable properties of tear strength, flexibility, stability and the like.

Presently, the ASTM D-3462 standard for tear strength for asphaltic roofing composites or shingles is met by the industry by increasing the weight of the mat and/or asphalt in the shingle, and by modification of urea-formaldehyde binders used therein, both of which methods are costly to the manufacturer.

Accordingly, an object of the present invention is to provide an asphalt roofing composite with glass fiber mats having enhanced tear strength, and particularly asphalt roofing shingles which can be in compliance with ASTM D-3462, without requiring an increase in the weight of the shingle or of modifying conventional binders used therein.

SUMMARY OF THE INVENTION

In accordance with this invention, asphalt roofing composites including a glass fiber mat are provided which, in the case of roofing shingles, preferably meet ASTM D-3462 roofing shingle standards for tear strength. The fiber mat is particularly characterized by including, by weight:

about 68% to about 90% of glass fibers; about 10% to about 32% of an organic resin binder, such as urea-formaldehyde; and about 0.001% to about 20%, preferably about 0.01% to about 10%, of an adhesion modifier, preferably a polysiloxane.

The adhesion modifier induces fiber pull-out during tear of the composite and provides improved composite tear strength.

When tested in accordance with ASTM D-3462, the shingle of this invention is characterized by a substantial number of pull-out fibers in the break area.

This invention also encompasses a process for the preparation of such adhesion modifier-treated fiber mats and asphalt roofing composites therewith, such a process includes the conventional steps of dispersing glass fibers in water along with a dispersing agent, film former or thickener, and a surfactant to obtain a glass fiber slurry; draining the slurry on a mat-forming machine having a mat forming screen, such as those commercially available from Voith or Sandy Hill, to obtain a wet web; transferring the wet web to a first carrier fabric; applying a binder solution, such as urea-formaldehyde, onto the wet web and removing excess binder by vacuum or other means; transferring the wet web onto a second carrier, such as a wire carrier, carrying the wet web into a dryer and then into a curing oven.

The invention process is characterized by coating the mat fibers with adhesion modifier during the process, suitably from an adhesion modifier solution or emulsion which is applied, preferably by spraying or dipping, onto the wet or dry mat before curing. Alternatively, the adhesion modifier solution may be admixed with the binder solution and applied to the wet web along with the binder solution, or sprayed onto the finished mat. In another embodiment, the adhesion modifier is applied to the fibers prior to forming the wet fiber web.

Suitably the treated-mat includes, by weight, about 0.001% to about 20%, preferably about 0.01% to about 10%, and most preferably about 0.1–1% of an adhesion modifier, preferably a polysiloxane, and has a mass of about 60 to 125 $g/m^2$.

The thus-treated fiber mat then is coated on one or both sides with conventional asphalt or asphalt compound to form a composite roofing product, as in the manufacture of roofing shingles. The presence of the adhesion modifier in the glass mat of the shingle of this invention can provide an ASTM D-3462 compliant product at conventional weight and without requiring modification of urea-formaldehyde binder used therein.

This invention is hereafter described with respect to a preferred embodiment, i.e., asphalt-impregnated glass mat treated with an adhesion modifier for use in shingles. However, the invention also finds utility in connection with glass mat for use in other composite roofing products, e.g., facer products, base sheets, mod bits, cap sheets, underlayments, BUR products and the like.

DETAILED DESCRIPTION OF THE INVENTION

Materials of Construction

Glass Fiber Mat

Figure 2:
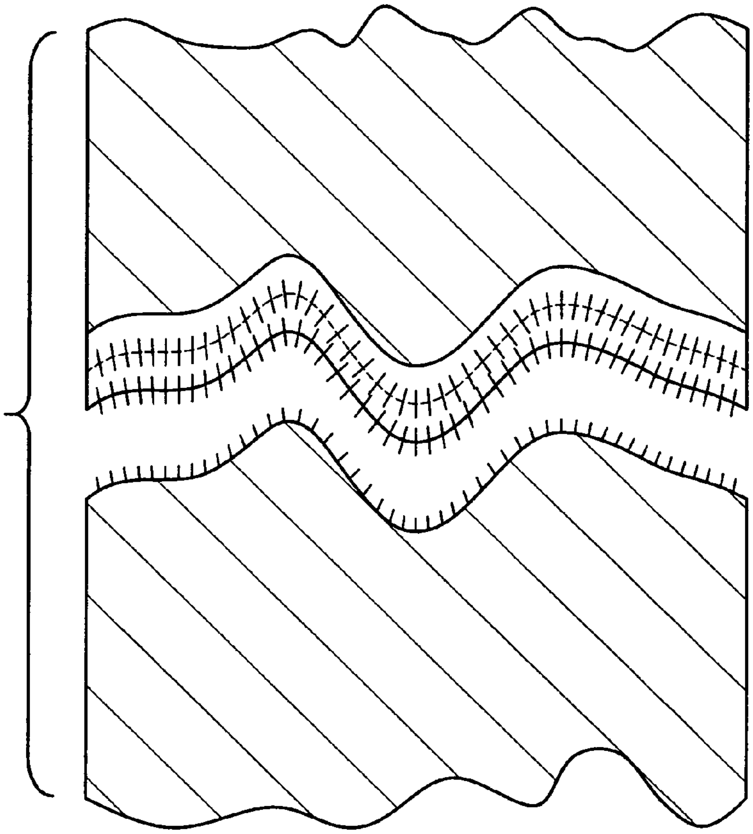
FIG. 2 is a top plan view illustrating the tear region featuring a substantial number of pulled-out fibers in a treated asphalt-impregnated glass mat of the invention.

The glass fiber mat used in the present invention comprises, by weight, about 68% to about 90% of glass fibers of suitable length and diameter. Typically, glass fibers having a length of about 3 mm to 130 mm and a diameter of about 5 to about 25 micrometers are used which can be obtained from commercial sources or made by techniques known in the art.

Glass Fiber Mat Manufacture

The glass fibers are dispersed in water with a dispersing agent. If desired, lubricants and defoamers may be added to the water with dispersing and emulsifying agents. The mixture then is agitated well until a homogeneous aqueous slurry of the glass fibers is obtained.

Next, the slurry is transferred to a mat-forming machine, and the liquid component is drained therefrom resulting in a wet fiber web obtained on the machine. The wet fiber web is then transferred to a second carrier fabric having interstices therein and a binder solution is applied thereto. The binder solution is applied to the wet web from a water solution thereof. The binder suitably is an organic resin such as urea-formaldehyde resin or a mixture of urea-formaldehyde resin and known modifiers of urea-formaldehyde resin. The excess of the binder solution is then removed from the wet fiber web by vacuum or other means and the web is transferred to a carrier wire which carries the web into a dryer and a curing oven.

The glass mat contains, by weight, about 10% to about 32% of the organic resin binder.

Adhesion Modifier

Suitable adhesion modifiers for use herein include siloxanes, glycerides, phosphate esters of fatty acids or alcohols, fatty ammonium salts, saponified oils, coconut oil, amines such as polyamines, fatty amines, fatty amine oxides, amido amines, polyamido amines, amine substituted terpenes, polyamides and mixtures of the above with glycerols or glycols. A 10% alkoxylated aliphatic polyamine emulsion in water, and a mixture of 60–90% alkoxylated aliphatic polyamine and 10–40% polyalkylene glycol have also been successfully employed.

Siloxanes useful in the asphalt composite of the present invention are generally classified as polysiloxanes and modified polymers thereof, with various substituents, branching and end-groups thereon, and copolymers thereof.

Suitable siloxanes for use in this invention may be selected from among polyalkyl siloxanes, polyaryl siloxanes, polyalkylaryl siloxanes and polyether siloxane copolymers. Mixtures of these compounds also may be used. Polysiloxanes having a molecular weight of at least 600, or polymerized at elevated temperatures in situ, are preferred to achieve the enhanced tear strength of the asphalt composites herein.

The polysiloxane may be applied in the form of a solution in water or isopropanol, or as an emulsion.

The adhesion modifier can be applied to the web in several alternative processes. In one process, the adhesion modifier is admixed with the binder solution and the mixed solution is applied to the web. In another process, a preferred embodiment, the adhesion modifier is applied by spraying the web immediately after the binder application. Alternatively, the adhesion modifier can be applied to the dried or cured glass fiber mat. In some cases, it is believed that the adhesion modifier can be added to the glass fiber size during fiber manufacture.

Process of Making the Asphalt Roofing Composite

The process of making the asphalt roofing composite of the present invention comprises the steps of: providing an adhesion-modifier treated glass mat, as described above; coating the glass mat on one or both sides with a conventional asphalt or asphalt compound, and, optionally, roofing granules; and cutting the finished product into desired sizes.

Testing of the Composite Asphalt Product

Tear test D-1922, as referenced in ASTM D-3462 (Jul. 10, 1997 edition), was used to test the tear property of glass fiber mats and shingles made by the present invention.

Briefly, the test measures the force in grams required to propagate tearing across a film or sheeting specimen using a pendulum device. Acting by gravity, the pendulum swings through an arc, tearing the specimen from a precut slit. The specimen is held on one side by the pendulum and on the other side by a stationary member. The loss in energy by the pendulum is indicated by a pointer. The scale indication is a function of the force required to tear the specimen.

The test specimens used were 3 inches in width and 2.5 inches in length.

In the laboratory, the finished fiber mats were coated with an asphalt solution consisting of 32% w/w asphalt having 68% w/w limestone filler. The coating was done on a two-roller coater with the coating poured at about 420° F. onto both sides of the finished mat as it was passed vertically through the coater. The target weight was 56 lb/CSF. The finished material was die cut into 2.5×3.0 inch Elmendorf Tear specimens to be tested both in machine direction (MD) and cross or transverse direction (CD). All specimens were weighed and those outside the weight limits of 56±4 lb/CSF were not tested.

A control, consisting of the same specimen as the test samples, except not sprayed with the polysiloxane solution, was also prepared.

The results of the testing of asphalt-coated hand sheets and of asphalt roofing shingles containing such treated glass mat are shown in Tables 1–5 below.

TABLE 1

| | | | Tear Strength of Asphalt-Coated Hand Sheet (in gf) | | |
|---|---|---|---|---|---|
| Code | Polysiloxane* | Mol. Wt. | Control | Dry Mat | Reheated Mat |
| L-7210 | Polyalkylene oxide-modified polydimethylsiloxane-dimethylsiloxane copolymer | 13,000 | 984 | 1424 | 1224 |
| L-7500 | Polyalkylene oxide-modified polydimethylsiloxane-dimethylsiloxane copolymer | 3,000 | 984 | 1105 | 1244 |
| L-7600 | Polyalkylene oxide-modified polydimethylsiloxane-dimethylsiloxane copolymer | 4,000 | 1107 | 1236 | 1379 |
| YBD-125 | (Carboxylatepropyl)methylsiloxane-dimethylsiloxane copolymer | >1,000 | 1237 | 1634 | 1863 |
| DBP-732 | Dimethylsiloxane-(60% PO-40% EO) block copolymer | 20,000 | 1237 | 1793 | 1625 |
| CMS-626 | (Hydroxyalkyl functional) methylsiloxane-dimethylsiloxane copolymer | 5,000 | — | 1098 | 1503 |
| AMS-162 | Aminopropylmethylsiloxane-dimethylsiloxane copolymer | 4,500 | 1259 | 1736 | 1602 |
| ATM 1322 | Aminoethylaminopropylmethoxysiloxane-dimethylsiloxane copolymer | >1,000 | 1218 | 1551 | 1712 |
| GP 502 | Glycidoxy propyl dimethoxy silyl end blocked dimethyl siloxane polymer | 5,000 | 1017 | 1169 | 1510 |
| GP 446 | Methacryloxy propyl dimethoxy silyl dimethyl siloxane polymer | 40,000 | 1072 | 1119 | 1507 |
| GP 501 | Vinyl dimethoxy silyl end-blocked dimethyl siloxane polymer | 6,500 | 1072 | 1128 | 1385 |
| GP 134 | Aminoethylaminopropyl dimethoxy silyl end blocked dimethyl siloxane polymer | 3,800 | 1237 | 1532 | 1684 |
| GP 7100 | Amine-alkyl modified methylalkylaryl silicone polymer | 7,800 | 1096 | 1369 | 1287 |
| Exp 32 | Epoxy functional dimethylpolysiloxane copolymer | 8,300 | 1096 | 1235 | 1658 |
| SWS 101 | Dimethylpolysiloxane | 26,439 | 1154 | 1153 | 1396 |
| ABP-263 | Dodecylmethylsiloxane-hydroxypolyalkyleneoxypropyl methylsiloxane copolymer | 1,900 | 1157 | 1527 | 1327 |
| ALT-263 | (Dodecylmethylsiloxane)-(2-phenylpropylmethylsiloxane) copolymer | >1,000 | 1154 | 1495 | 1305 |
| L-77 | Polyalkylene oxide-modified polydimethylsiloxane-dimethylsiloxane copolymer | 600 | 1072 | 1168 | 1134 |

*A 2% solution in IPA was sprayed onto cured glass mat, dried to remove solvent, and reheated to 300° C. for 10 sec.

TABLE 2

| Polysiloxane* Code | % Solids | Tear Strength of Asphalt-Coated Hand Sheet (in gf) Control | Dry Mat | Reheated Mat |
|---|---|---|---|---|
| RCTW 9011 | 1.4 | 1129 | 1253 | |
| RCTW 9130 | 1.4 | 1129 | 1356 | |
| RCTW B9296 | 1.4 | 1129 | 1352 | |
| RCTW B9296 | 1.4 | 1028 | 1224 | 1485 |
| RCTW B9296 | 0.14 | 966 | 1182 | 1401 |
| RCTW B9296 | 0.14 | 966 | 1182 | 1292# |
| RCTW B9296 | 0.14 | 959 | | 1306 |
| RCTW B9296 | 0.08 | 959 | | 1145 |
| RCTW B9296 | 0.04 | 959 | | 1125 |

Dry mat: dried at 135° F. for 0.5~1 hours. Heated mat: heated at 300° C. for 10 seconds.
#heated at 220° C. for 15 seconds.
*Chemtrend, Div. of Castrol, Inc.—mixture of polydimethylsiloxanes, M.W. >1000; 50% solids; as emulsion sprayed onto cured glass mat.

TABLE 3

| Poly-siloxane* Code | Wt. Ratio of Polysiloxane-to-Binder | Tear Strength of Asphalt-Coated Hand Sheet (in gf) Control | Dry Mat (a) | Reheated Mat (b) |
|---|---|---|---|---|
| B9296 | 0.24-to-99.76 binder | 1199 | 1693 | 1602 |
| B9296 | 0.48-to-99.52 binder | 1199 | 1518 | 1640 |
| B9296 | 0.96-to-99.04 binder | 1199 | 1795 | 2018 |
| B9296 | 0.9-to-99.10 binder | 1218 | 2129 | 1965 |
| B9296 | 1.8-to-98.20 binder | 1218 | 1855 | 2390 |

*Emulsions were sprayed onto wet glass mats prior to drying and curing.
(a) coated with filled asphalt as received;
(b) reheated at 300° C. for 10 seconds, then coated with filled asphalt

TABLE 4

| Poly-siloxane* Code | Wt. Ratio of Polysiloxane-to-Binder | Tear Strength of Asphalt-Coated Hand Sheet (in gf) Control | Dry Mat (a) | Reheated Mat (b) |
|---|---|---|---|---|
| B9296 | 1-to-99 binder | 1218 | 1369 | 1544 |

*Emulsion was added to binder system, then sprayed onto wet glass mat.
(a) coated with filled asphalt as received;
(b) reheated at 300° C. for 10 seconds, then coated with filled asphalt

TABLE 5

| Poly-siloxane* Code | Wt. Ratio of Polysiloxane-to-Binder | Tear Strength of Shingle (in gf) Control | Dry Mat (a) | Reheated Mat (b) |
|---|---|---|---|---|
| B9296 | 1-to-99 binder | 1552 | 2207 | |

*Emulsions were sprayed onto wet glass mats prior to drying and curing, and formed into asphalt shingles**.
**D-3462 ASTM standard for tear strength of 1700 gf.

The results in Tables 1–4 establish that the presence of a polysiloxane in the glass mat substantially improves the tear strength of both the dry and reheated asphalt-coated hand sheet; Table 5 shows a similar effect for asphalt shingles which include such polysiloxane-treated mat. Suitably asphalt shingles have a tear strength of 2207 in gf which is substantially in excess of the 1700 gf required by the ASTM standard of 1700 required of commercial asphalt-roofing shingles.

When torn, the composite roofing products of this invention are characterized by a substantial number of "pull-out" fibers in the break area. The roofing shingle of this invention is characterized by a substantial number of "pull-out" fibers in the break area when tested in accordance with ASTM D-3462. By a substantial number of "pull-out" fibers, it is meant that at least 10, preferably at least 25 and more preferably at least 50 fibers can be counted in the break area having a "pull-out" length portion at least ¼ that of the average fiber length.

Figure 1:
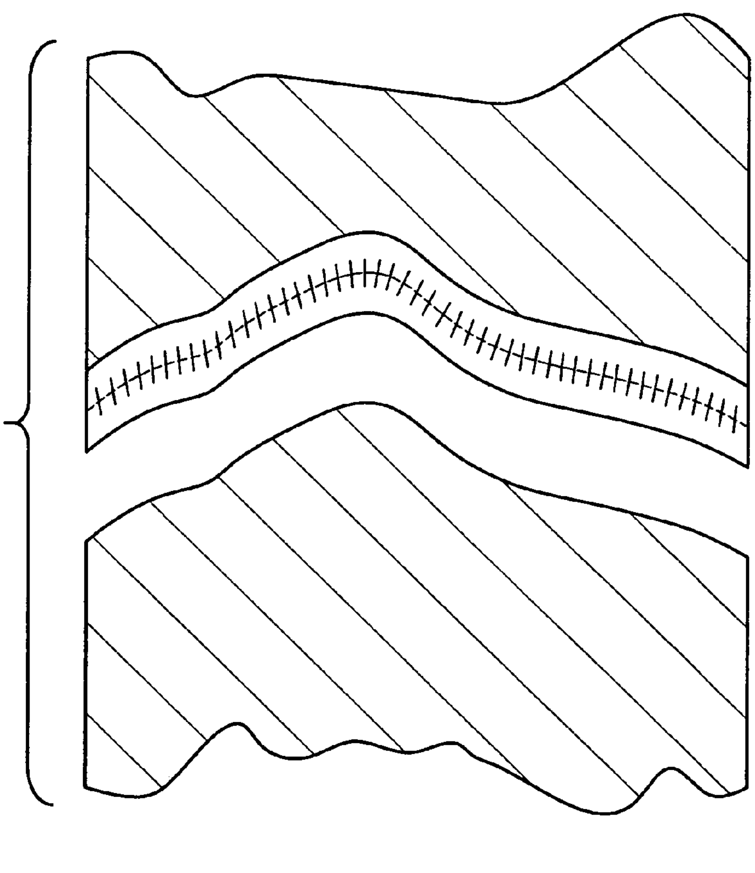
FIG. 1 is a top plan view illustrating the tear region featuring broken fibers in an untreated asphalt-impregnated glass mat of the prior art.

While the mechanism of enhancing the tear strength of asphalt roofing shingles by application of an adhesion modifier, e.g., polysiloxane, to the glass fiber mat is not completely understood at present, it is believed that the adhesion modifier modifies the adhesion characteristics between the glass mat and asphalt coating. In accordance with this invention, we unexpectedly observe that adhesion modifier treated asphalt-impregnated glass mats feature a tear region in which the fibers are pulled out, not torn or broken, as with prior art untreated asphalt-impregnated glass mat. It is believed that this mechanism contributes substantially to the energy dissipation during the tear process. Accordingly, the tear from shingles containing adhesion modifier-treated glass mats reveal pulled-out fibers, rather than torn or broken fibers, as observed from shingles with untreated mats as depicted in FIGS. 1 and 2.

While the invention has been described with particular reference to certain embodiments thereof, it will be understood that changes and modifications may be made which are within the spirit and scope of the invention.

What is claimed is:

1. A glass fiber mat for use in making a roofing composite of asphalt-coated hand sheets and asphalt shingles, said mat comprising, by weight, about 68% to about 90% of fibers; about 10% to about 32% by weight of an organic resin binder; and having applied to the surface of said glass mat about 0.001% to about 20% by weight of an adhesion modifier which is non-reactive with said surface of the glass mat but which induces fiber pull-out during tear of the composite and thereby provides improved composite tear strength wherein said asphalt-coated hand sheets and asphalt shingles thereof meet or exceeds Tear Test D-1922 (ASTM D-3462, Jul. 10, 1997 Ed), and wherein said adhesion modifier is a polysiloxane.

2. A glass fiber mat according to claim 1 wherein the amount of adhesion modifier is about 0.01% to about 10%.

3. A glass fiber mat according to claim 1 wherein said polysiloxane is a polyalkyl siloxane, a polyaryl siloxane, a polyalkylaryl siloxane or a polyether siloxane, or derivative thereof.

4. A glass fiber mat according to claim 3 wherein said polysiloxane is a polydimethyl siloxane or derivative thereof.

5. A glass fiber mat according to claim 3 wherein said polysiloxane has a molecular weight>600.

6. A glass fiber mat according to claim 1 wherein said organic resin binder includes a urea-formaldehyde resin.

7. A glass fiber mat of claim 1 wherein said glass fibers have a length of about 3 mm to about 130 mm, and a diameter of about 5 micrometers to about 25 micrometers.

* * * * *